US012769647B2

(12) United States Patent
Tiwari et al.

(10) Patent No.: US 12,769,647 B2
(45) Date of Patent: Oct. 20, 2026

(54) SYSTEMS AND TECHNIQUES FOR UPDATING LOGICAL-TO-PHYSICAL MAPPINGS

(71) Applicant: Micron Technology, Inc., Boise, ID (US)

(72) Inventors: Ritesh Tiwari, Bangalore (IN); Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 35 days.

(21) Appl. No.: 18/444,421

(22) Filed: Feb. 16, 2024

(65) Prior Publication Data

US 2024/0289272 A1 Aug. 29, 2024

Related U.S. Application Data

(60) Provisional application No. 63/447,870, filed on Feb. 23, 2023.

(51) Int. Cl.
*G06F 12/02* (2006.01)
*G06F 12/0882* (2016.01)

(52) U.S. Cl.
CPC ...... *G06F 12/0246* (2013.01); *G06F 12/0882* (2013.01); *G06F 2212/7201* (2013.01)

(58) Field of Classification Search
CPC ............. G06F 12/0246; G06F 12/0882; G06F 2212/7201; G06F 2212/1008; G06F 2212/1024; G06F 2212/7208
See application file for complete search history.

(56) References Cited

U.S. PATENT DOCUMENTS

| | | | | |
|---|---|---|---|---|
| 9,977,612 | B1 * | 5/2018 | Lo | G06F 3/064 |
| 10,990,480 | B1 * | 4/2021 | Bernat | G06F 3/0689 |
| 11,977,773 | B2 * | 5/2024 | Das | G06F 3/0644 |
| 2019/0012099 | A1 * | 1/2019 | Mulani | G06F 3/0619 |
| 2019/0042799 | A1 * | 2/2019 | Durham | G06F 21/64 |
| 2019/0370169 | A1 * | 12/2019 | Amato | G06F 12/1018 |
| 2021/0240628 | A1 * | 8/2021 | Meiri | G06F 16/1824 |
| 2022/0283954 | A1 * | 9/2022 | Prasad | G06F 12/1072 |
| 2023/0376228 | A1 * | 11/2023 | Cariello | G06F 3/0655 |
| 2024/0345949 | A1 * | 10/2024 | Liu | G06F 12/0871 |

* cited by examiner

*Primary Examiner* — Zhuo H Li
(74) *Attorney, Agent, or Firm* — Holland & Hart LLP

(57) ABSTRACT

Methods, systems, and devices for systems and techniques for updating logical-to-physical (L2P) mappings are described. A memory system may support improved change log entries that supports a change log entry to indicate updated L2P mapping information for multiple data chunks, thus increasing the amount of data indicated by the change log before it becomes full. One change log entry may be used to indicate updated L2P information for multiple sequential data chunks. For example, the memory system may write data to a set of contiguous data chunks of a non-volatile memory device. The memory system may write a change log entry to a change log that includes updated L2P mapping information for the set of data chunks by including at least a first indication of a virtual block that includes the data chunks and a second indication of the quantity of data chunks in the set.

19 Claims, 7 Drawing Sheets

200

202

| | 221 | 222 | 223 | 224 | 225 |
|---|---|---|---|---|---|
| | LBA | VBA | Length | Offset | Overlap |
| 401 | 3 | 2 | 8 | X | 0 |
| 402 | 12 | 2 | 6 | X+8 | 0 |

202

| LBA (221) | VBA (222) | Length (223) | Offset (224) | Overlap (225) | |
|---|---|---|---|---|---|
| 3 | 2 | 3 | X | 0 | 541 |
| 6 | 2 | 5 | X+3 | 1 | 542 |
| 6 | 2 | 6 | X+14 | 0 | 543 |
| 12 | 2 | 2 | X+8 | 1 | 544 |
| 12 | 2 | 2 | X+20 | 0 | 545 |
| 14 | 2 | 4 | X+10 | 0 | 546 |

SYSTEMS AND TECHNIQUES FOR UPDATING LOGICAL-TO-PHYSICAL MAPPINGS

CROSS REFERENCE

The present Application for Patent claims priority to U.S. Patent Application No. 63/447,870 by Tiwari et al., entitled "SYSTEMS AND TECHNIQUES FOR UPDATING LOGICAL-TO-PHYSICAL MAPPINGS," filed Feb. 23, 2023, which is assigned to the assignee hereof, and which is expressly incorporated by reference herein.

TECHNICAL FIELD

The following relates to one or more systems for memory, including systems and techniques for updating logical-to-physical (L2P) mappings.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states if disconnected from an external power source.

DETAILED DESCRIPTION

Figure 1:
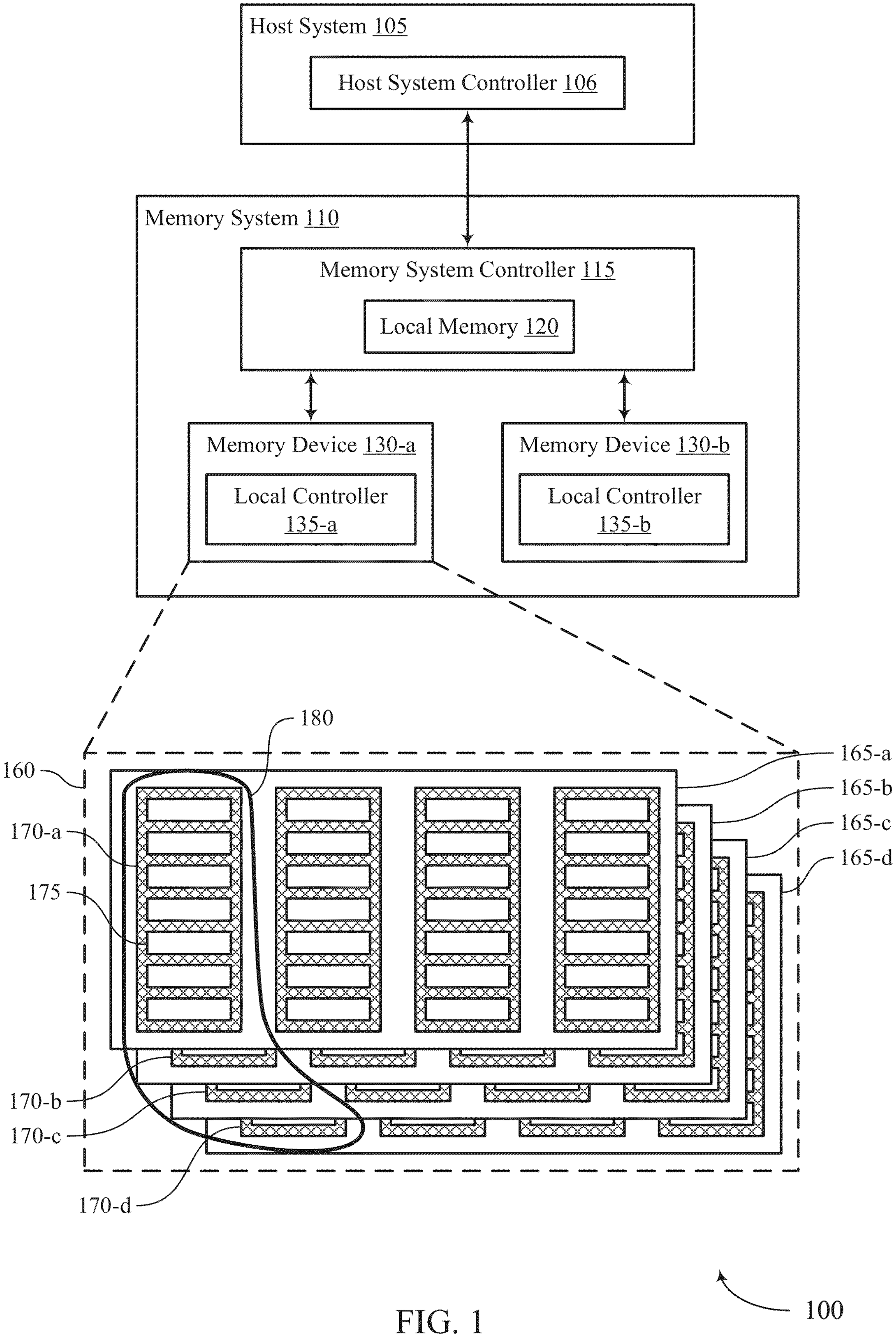
FIG. 1 illustrates an example of a system that supports systems and techniques for updating logical-to-physical (L2P) mappings in accordance with examples as disclosed herein.

Methods, systems, and devices for systems and techniques for updating logical-to-physical (L2P) mappings are described. Write operations to non-volatile devices may include maintaining L2P table data used to identify relationships between logical addresses used by the host system and physical addresses used by the memory system to store data. For example, as part of writing data to a non-volatile device, a logical address corresponding to the written data may be written to a physical address within the non-volatile devices, and a mapping between the logical address and the physical address may be recorded into the L2P table. The L2P table is, in some cases, larger than an amount of memory available for use to store the L2P table within a memory system controller (e.g., a volatile device used in updating the L2P table) of the memory system. As such, the L2P table may be stored in the non-volatile devices and new L2P address translation mappings may be maintained within a change log (e.g., a change log buffer, a change log manager (CLM)) containing change log entries until the L2P table may be updated.

To update the L2P table, corresponding portions of the L2P table may be transferred to the memory system controller from one or more non-volatile devices and updated based on the change log entries. The portions may then be transferred back to the one or more non-volatile devices for storage. In this way, multiple entries of the L2P table may be updated at a time to reduce the quantity of transfers between the one or more non-volatile devices and memory system controller. The contents of the change log buffer may be periodically applied to update the L2P table, for example, based on the change log buffer becoming full. The maintenance of the change log buffer and its application to the L2P table imposes overhead processing requirements upon the memory system.

In some memory system controllers (e.g., especially in low-cost memory systems), a size of the change log buffer may be limited, which may result in relatively frequent application of the contents of the change log buffer to the L2P table based on the change log buffer becoming full of data. Reducing the frequency of the application of the contents of the change log buffer to the L2P table may reduce the overhead required by the memory system resulting in an increase of memory system performance.

Implementations described herein address the aforementioned shortcomings and other shortcomings by providing improved change log entries that support a change log entry to indicate updated L2P mapping information for multiple data chunks, thus increasing the amount of data indicated by the change log before it becomes full. The increase of the amount of data indicated by each entry within the change log buffer will lengthen the time between respective applications of the contents of the change log buffer to the L2P table. The increase in the amount of data corresponding to each change log entry within the change log buffer is achieved by indexing a virtual block component of the physical address of respective data chunks (e.g., pages, 4 kilobyte (kB) data chunks), which may be common to multiple entries of the change log (e.g., entries associated with physical addresses that are included in same virtual blocks), thereby permitting the physical address to be specified in fewer bits. The physical address may be defined in the improved change log entries using an address that includes an indication of a virtual block number (VBN) (e.g., an index corresponding to the VBN), an offset value of a starting location of a data chunk, and a length value indicating the quantity of sequential data chunks associated with the change log entry. Thus, one change log entry may be used to indicate updated L2P information for multiple sequential data chunks (e.g., rather than one change log entry per data chunk). In some examples, the change log entry may include an overlap flag value indicating whether data chunks indicated by the change log entry have been invalidated. The improved change log entries containing these values permits the memory system controller to store L2P information updates for a larger quantity of data within the change log buffer, thus reducing the frequency at which the contents of the change log buffer are applied to the L2P table.

Features of the disclosure are initially described in the context of a system with reference to FIG. 1. Features of the disclosure are described in the context of providing improved change log entries that support a change log entry to indicate updated L2P mapping information for multiple data chunks, thus increasing the amount of data indicated by the change log before it becomes full in reference to FIGS. 2 through 6.

Figure 7:
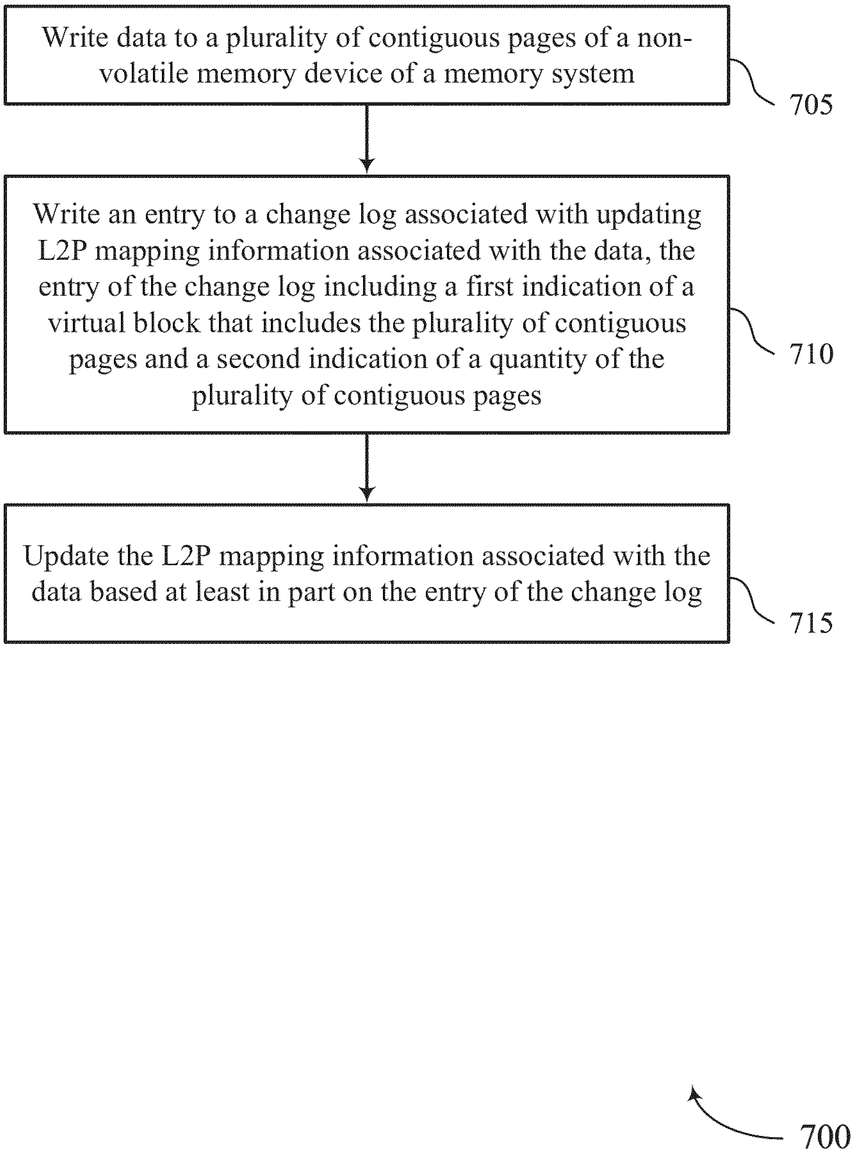
FIG. 7 illustrates a flowchart showing a method or methods that support systems and techniques for updating L2P mappings in accordance with examples as disclosed herein.

These and other features of the disclosure are further illustrated by and described in the context of an apparatus diagram and flowchart that relate to systems and techniques for updating L2P mappings with reference to FIGS. 7 through 8.

FIG. 1 illustrates an example of a system 100 that supports systems and techniques for updating L2P mappings in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a universal flash storage (UFS) device, an embedded multi-media controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a fiber channel interface, a small computer system interface (SCSI), a serial attached SCSI (SAS), a double data rate (DDR) interface, a DIMM interface (e.g., DIMM socket interface that supports DDR), an open NAND flash interface (ONFI), and a low power double data rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, spin transfer torque (STT)-MRAM, conductive bridging RAM (CBRAM), resistive random access memory (RRAM), oxide-based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be “block 0” of plane 165-*a*, block 170-*b* may be “block 0” of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a L2P mapping table to associate the logical address (e.g., LBA) for the data with the new, valid block 170 rather than the old, invalid block 170. In some cases, such copying and remapping may be performed instead of erasing and rewriting the entire old block 170 due to latency or wear out considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as “garbage collection” may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support systems and techniques for updating L2P mappings. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system controller 115 may maintain and update an L2P mapping table using a change log buffer (e.g., a change log buffer 202, shown in FIG. 2) containing change log entries associated with changes made to L2P mappings that are yet to be updated in the L2P mapping table (e.g., an L2P table 201). The entries within the change log buffer may be applied periodically to the L2P mapping table to maintain the L2P mappings of data stored in the memory devices 130, for example, based on the change log buffer becoming full. The updating of the L2P mapping table may create memory system controller 115 processing overhead that may affect memory system performance. Increasing the quantity of updated L2P mappings that may be indicated by the entries of the change log buffer before application of the entries may reduce the processing overhead of the memory system controller 115.

More specifically, an increase in the quantity of updated L2P mappings that may be indicated by the entries will lengthen the time between application of the contents of the change log buffer to the L2P mapping table. The inclusion of additional fields in a change log entry within the change log buffer is achieved by indexing a virtual block component (e.g., a VBN) of the physical address of respective data chunks, which may be common to multiple entries of the change log (e.g., entries associated with physical addresses that are included in same virtual blocks), thereby permitting the physical address to be specified in fewer bits. The physical address may be indicated in the improved change log entries using an address that includes an indication of a VBN (e.g., an index corresponding to the VBN), an offset value of a starting location of a data chunk (e.g., a page 175), and a length value indicating the quantity of sequential data chunks (e.g., sequential pages 175) associated with the change log entry. Thus, one change log entry may be used to indicate updated L2P information for multiple sequential data chunks (e.g., rather than one change log entry per data chunk). In some examples, the change log entry may include an overlap flag value indicating whether data chunks indicated by the change log entry have been invalidated (e.g., whether the data chunks store invalid data). The improved change log entries containing these values permits the memory system controller to store L2P information updates for a larger quantity of data within the change log buffer, thus reducing the frequency at which the contents of the change log buffer are applied to the L2P mapping table.

Figure 2:
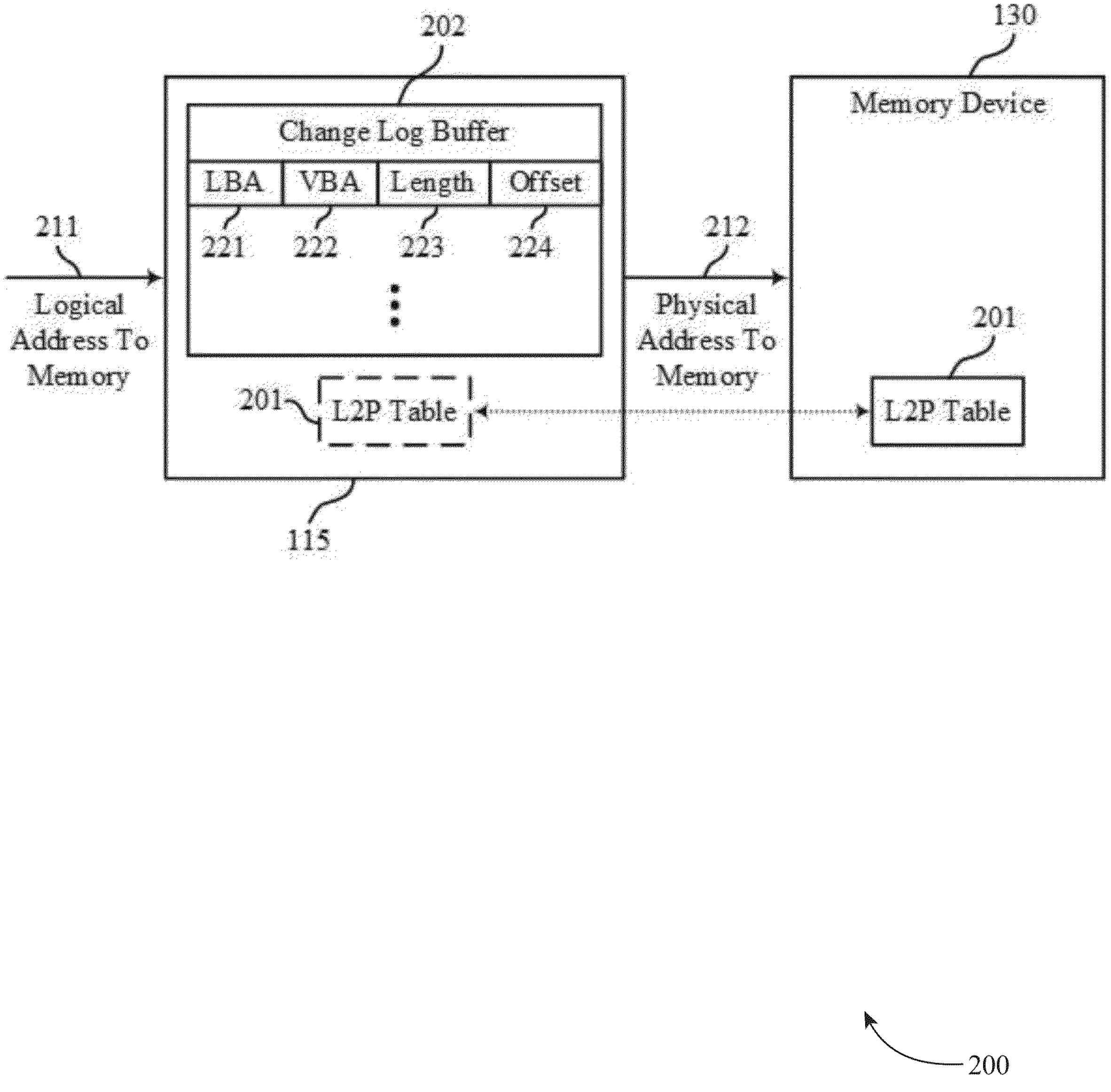
FIGS. 2, 3, 4, and 5 illustrate examples of mapping diagrams that support systems and techniques for updating L2P mappings in accordance with examples as disclosed herein.

FIG. 2 illustrates an example of a mapping diagram 200 that supports systems and techniques for updating L2P mappings in accordance with examples as disclosed herein. The mapping diagram 200 may be implemented by aspects of the system 100 described with reference to FIG. 1. For example, the mapping diagram 200 includes a memory system controller 115 and a memory device 130. The mapping diagram 200 shows a memory device 130 being accessed for read operations using a physical address 212 (e.g., a physical block address (PBA)) that is obtained from a L2P table 201. A logical address 211 (e.g., a logical block address (LBA)) may be included within read and write operation commands received by the memory system controller 115 from a host system 105. The memory system controller 115 may obtain, as part of a read operation, the physical address 212 from the L2P table 201 corresponding to the logical address 211 or, for the data recently modified, from the change log 202. The physical address 212 is used to access data within the memory device 130 during read operations and is used to store data within the memory device 130.

If data is written to the memory device 130, a data chunk (e.g., a page 175) is written to an unused location of data within the memory device 130 and an indication of which physical address the data corresponding to the logical address was written to is stored in the change log buffer 202 as a respective change log entry. After the change log is full (e.g., or due to some other trigger, such as an idle host time), portions of the L2P table 201 may be updated and transferred to the memory system controller 115 from the memory device 130, where the contents of the change log buffer 202 may be applied to the L2P table 201 and the portions of the L2P table 201 may be transferred (e.g., flushed) back to the memory device 130. As part of a write operation, the memory system controller 115 may identify an unused location within the memory device 130 (e.g., a page 175 that includes no data) having a physical address 212 and write data to the physical address 212. A mapping of the logical address 211 the physical address 212 is recorded within a change log buffer 202 for use if the data stored therein is accessed in subsequent read operations.

The change log buffer 202 may include a set of change log entries where each entry is associated with the storage of data in operations described above. Each entry within the change log buffer 202 may be improved by permitting each entry to address more than one data chunk (e.g., page 175) within a data block (e.g., a virtual block 180, a block 170). For example, each entry may include an LBA value 221, a VBN value 222, a length value 223, and an offset value 224. The LBA value 221 may indicate a logical address 211 (e.g., the LBA) to which the change log entry corresponds. The LBA value 221 may indicate a starting LBA to which the change log entry corresponds.

The VBN value 222 may indicate a virtual block to which the change log entry corresponds. That is, the VBN value 222 may indicate the virtual block that includes the data associated with the logical address indicated by the LBA value 221. The offset value 224 may indicate an offset (e.g., a page offset) within the virtual block. A combination of the VBN value 222 and the offset value 224 may be used to determine the physical address 212 of a starting data chunk (e.g., a starting page 175) indicated by the change log entry. For example, prior to adding entries to the change log buffer 202 (e.g., after previously applying its contents to the L2P table 201), the memory system controller 115 may store a current offset (e.g., a current page offset) within the virtual block (e.g., store a respective current offset within each open virtual block). The current offset may correspond to a next offset after a last-written-to data chunk (e.g., page 175) of the virtual block. That is, the current offset may indicate the offset of the next contiguous data chunk within the virtual block to which data is to be written. Accordingly, to determine the physical address 212, the memory system controller 115 may determine the virtual block (e.g., a VBN, an identifier of the virtual block) based on the VBN value 222 and the offset within the virtual block by adding the offset value 224 to the stored current offset. A combination of the VBN and the offset within the virtual block may be or be representative of the physical address 212.

The length value 223 may indicate a quantity of contiguous data chunks (e.g., contiguous pages 175) pointed to by the change log entry (e.g., starting with the starting data chunk indicated by the VBN value 222 and the offset value 224). The length value 223 may also indicate a quantity of contiguous LBAs pointed to by the change log entry (e.g., starting with the starting LBA indicated by the LBA value 221). As such, the change log entry may indicate L2P mapping information for multiple LBAs to data chunks (e.g., pages 175). For example, the change log entry may include the mapping of the starting of the LBA indicated by the LBA value 221 to the starting physical address 212 indicated by the VBN value 222 and the offset value 224. In accordance with the length value 223, a next contiguous LBA after the starting LBA may map to a next contiguous physical address 212 (e.g., a physical address of a next contiguous page 175) after the starting physical address 212, and so on for the quantity of contiguous LBAs and data chunks indicated by the length value 223. Explicit mappings for the contiguous LBAs to contiguous data chunks after the starting LBA and data chunk may be excluded from the change log entry and may instead be determined by the memory system controller 115 based on the length value 223 and the starting LBA and data chunk.

The memory system controller 115 may determine the physical address 212 used in subsequent read operations by searching either the L2P table 201 or the change log buffer 202 to find a current translation value. For example, the L2P table 201 may be used to determine the physical address 212 in subsequently accessing the data if the L2P table 201 has been updated (e.g., the contents of the change log buffer 202 have been applied to the L2P table). If the L2P table 201 has not yet been updated based on the contents of the change log buffer 202, the change log buffer 202 may be used to determine the physical address 212. The L2P table 201 is typically larger than the size of available volatile memory (e.g., local memory 120) used by the memory system controller 115. In some examples, the memory system controller 115 may store a portion of the L2P table 201 within the volatile memory that corresponds to data blocks currently open for access and modification. The L2P table 201 is stored within the memory device 130.

The change log buffer 202 contains changes to the L2P table 201 associated with recent write operations within the open data blocks. The contents of the change log buffer 202 may be periodically applied to the contents of the L2P table 201 stored within the memory device 130 to reflect the current mapping of logical addresses 211 to physical addresses 212 in use in the memory device 130. In some examples, the contents of the change log buffer 202 may be periodically applied, for example, if the change log buffer 202 becomes full, if an open data block is no longer in use, if the memory system 110 or the host system 105 enter an idle state, or any combination thereof.

In some implementations of the change log buffer 202, a change log entry may contain an updated mapping for one logical address 211 to one physical address 212. By use of the length value 223 and offset value 224 to maintain the mappings of logical addresses 211 to physical addresses 212, the quantity of entries within the change log buffer 202 to indicate updates for a same quantity of L2P mappings may be reduced. That is, the quantity of data for which the change log buffer 202 includes updated L2P mappings may increase due to being able to indicate updated L2P mappings for multiple logical addresses per change log entry, which may lengthen the time before the change log buffer 202 becomes full. As a result, the frequency at which the contents of the change log buffer 202 is applied to the L2P table 201 may be reduced. This change in operation of the memory system controller 115 to maintain the change log buffer 202 reduces processing overhead of the memory system controller 115 and increases performance of the memory system 110, for example, as more time may be devoted to the performance of other operations of the memory system 110 instead of updating the L2P table.

The quantity of bits included in a respective change log entry within the change log buffer 202 may be unchanged. For example, the quantity of bits used for the VBN value 222, the length value 223, and the offset value 224 may together be the same quantity of bits as a combination of an actual VBN (e.g., virtual block identifier) and an actual offset within a virtual block (e.g., a current offset). Various techniques may be used to reduce a quantity of bits used to indicate the actual VBN and the actual offset via the inclusion of the VBN value 222 and the offset value 224 such that the length value 223 may be included in a change log entry.

For example, the memory system controller 115 may store a mapping between a set of indexes used as indications of the virtual block in the entry (e.g., VBN values 222) and identifiers of virtual blocks (e.g., actual VBNs). In an example embodiment, the VBN value 222 referenced within each entry to the change log buffer 202 corresponds to a VBN as shown in Table 1.

TABLE 1

| VBN (2 Bits) | Actual Block Number (9 bits) |
|---|---|
| 00 | 101111001 |
| 01 | 110001001 |
| 10 | 1111111111(invalid/free) |
| 11 | 1111111111(invalid/free) |

In this example embodiment of the stored mapping between indexes and identifiers, 4 virtual blocks may be open at one time, permitting use of 2 bits to represent a VBN. For example, in accordance with the stored mapping, the memory system controller 115 may determine that a change log entry including a VBN value of '00' may correspond to a virtual block having the VBN '101111001,' and so on. If 8 open blocks are supported, 3 bits may be used to represent the VBN, and so on. In the example embodiment of Table 1, the actual block number may use 9 bits, and thus using the VBN value 222 to represent the actual VBN in the change log entry may save 7 bits per change log entry for other use, such as for the length value 223.

In some examples, the mapping may be updated as virtual blocks are opened. For example, in the example of Table 1, two virtual blocks may be open with corresponding VBNs mapped to respective indexes. If the memory system controller 115 opens a third virtual block for writing additional data, the memory system controller 115 may update the mapping to map an unused index (e.g., '10' or '11' in the example of Table 1) to a VBN of the third virtual block (e.g., replace '111111111', which may be a bit pattern indicating that the index is unused, with the VBN of the third virtual block). In some examples, the quantity of bits for the VBN value 222 may increase as the quantity of open virtual blocks increases. For example, if a fifth virtual block is opened by the memory system controller 115 (e.g., concurrent with other virtual blocks associated with the mapping, after one or more of the virtual blocks have been closed but before the contents of the change log buffer 202 have been applied), the memory system controller 115 may update the mapping and the change log entries such that the VBN value 222 uses 3 bits to support the greater quantity of virtual blocks.

A similar mapping may be used to indicate a current offset of a corresponding virtual block, for example, to use with the VBN value 222 and the offset value 224 to determine a physical address 212 indicated by a given change log entry, as shown in Table 2.

TABLE 2

| VBN (2 Bits) | Current Offset of Open Blocks (23 bits) |
|---|---|
| 00 | 00010110110110110111011 |
| 01 | 00000101111000101110111 |
| 10 | 11111111111111111111111 (invalid/free) |
| 11 | 11111111111111111111111 (invalid/free) |

ock Number (2 bit)

In some examples in which a change log entry indicates updated L2P mapping information for a single LBA, if 9 bits are allocated for a VBN, then the remaining 23 bits of a change log entry may be allocated for offset. With this 23 bits, a virtual block size can be up to 32 GB. Here, the change log buffer 202 may be flushed (e.g., the contents of the change log buffer 202 may be applied to the L2P table 201, for example, due to becoming full) after 16 MB of data writes. The storage of the current offset may enable the use of a fewer quantity of bits for the offset value 224 to indicate the offset within the virtual block. For example, in an embodiment in which the change log buffer 202 may be merged with the L2P table 201 (e.g., the contents of the change log buffer 202 are applied to the L2P table 201) based on a threshold quantity of data, such as 1 GB of data, being written, the offset value 224 may use 18 bits. For instance, an 18 bit offset value 224 may be used to indicate a respective data chunk (e.g., page 175) within a respective 1 GB chunk of a 32 GB virtual block. To indicate which 1 GB chunk of a respective 32 GB virtual block, the memory system controller 115 may store actual offset values (e.g., current offsets, current page offsets) of each open virtual block before any change log entries are added in the change log buffer 202. Later during flushing of the change log buffer 202 and merging of its contents to the L2P table 201, a relative offset (e.g., the offset value 224 stored in change log entries) is added to the current offset (e.g., stored in Table 2) to merge the entries with the L2P table 201 (e.g., to determine the respective physical addresses 212 indicated by each change log entry). In some examples, if a new virtual block is opened before the change log buffer 202 is merged with the L2P table 201, a current offset of the new virtual block may be determined and added to the VBN value 222 to current offset mapping (e.g., the mapping of Table 2). Alternatively, and in general when the number of tracked VB reaches the maximum, a merge of the changelog into the L2P might be forced.

In some examples, a respective current offset for each virtual block may be updated after updating the L2P table 201 using the change log buffer 202 (e.g., after merging the change log buffer 202 and the L2P table 201). For example, the memory system controller 115 may update the current offset (e.g., within the mapping of Table 2) of a virtual block to a next contiguous data chunk (e.g., contiguous page 175) after the last data chunk of the virtual block pointed to by the change log buffer 202. As such, accurate tracking of the current offset within the virtual block may be maintained.

In some examples, the threshold quantity of data used to determine the bit quantity for the offset value 224 may be determined (e.g., set) based on a risk of data and mapping information loss. For example, the change log buffer 202 may be stored in volatile memory, and thus its contents may be lost, for example, if the memory system suffers a power loss. Accordingly, delaying the merging of the change log buffer 202 and the L2P table 201 to reduce processing overhead may be balanced with longer recovery time after a power loss, increased latency associated with merging change log buffer 202 that includes L2P mapping updates for an increased quantity of data, or a combination thereof, to determine respective quantities of bits used for the VBN value 222, the length value 223, the offset value 224, or a combination thereof.

In some other examples, the offset value 224 may include a same quantity of bits as is used to indicate the offset within a virtual block (e.g., 23 bits). For example, bits used for the length value 223 (e.g., and an overlap value 225 described with reference to FIGS. 4 and 5) may be obtained via the use of the mapping between VBN values 222 and VBNs. Here, the storage of current offsets for each open virtual block, as described with reference to Table 2, may be unnecessary.

With respect to a quantity of bits allocated to the length value 223, in an example embodiment, if 4 bits are used as indexes for VBNs (covering up to 16 open virtual blocks), 1 bit may be given for overlap (as described with reference to FIGS. 4 and 5) and the remaining 4 bits can be given to length field, which may indicate up to sixteen 4 KB data chunks (e.g., a 64 KB data range per entry compared to a single 4 KB data chunk). If 4 bits is insufficient for the length value 223 and if 18 bits are given for the offset value 224 (covering up to 1 GB writes in an open virtual block), the length value 223 may be assigned up to another 5 bits. In total if 4 bits are used for the VBN value 222 and 18 bits for the offset value 224, then a total of up to 9 bits can be assigned to length value 223. In this example, a change log entry may point to 512 continuous 4 KB data chunks, for a total of up to 2 MB per change log entry.

The change log buffer 202 may be sorted based on LBA values to support efficient search for read operations. Each change log entry may span more than one 4 KB data chunk because of length value 223. As such, searching for a change log entry for a respective L2P mapping (e.g., as part of a read operation) may consider the length value 223 also. In some examples, the maximum length per change log entry may be chosen so that search performance is not impacted (e.g., an impact to search performance is relatively unaffected). For example, choosing a very high length per change log entry may make searching slower, depending upon write pattern and/or workload that may cause overlap operations (e.g., invalidation of previously written data before merging the change log buffer 202 and L2P table 201).

While the above example describes host system memory operations, the change log buffer 202 and the entries disclosed herein applies to garbage collection operations periodically performed by the memory system controller 115. If the memory system controller 115 performs a write operation as part of a garbage collection process, similar change log entries are made into the change log buffer 202 as otherwise disclosed herein.

Figure 3:
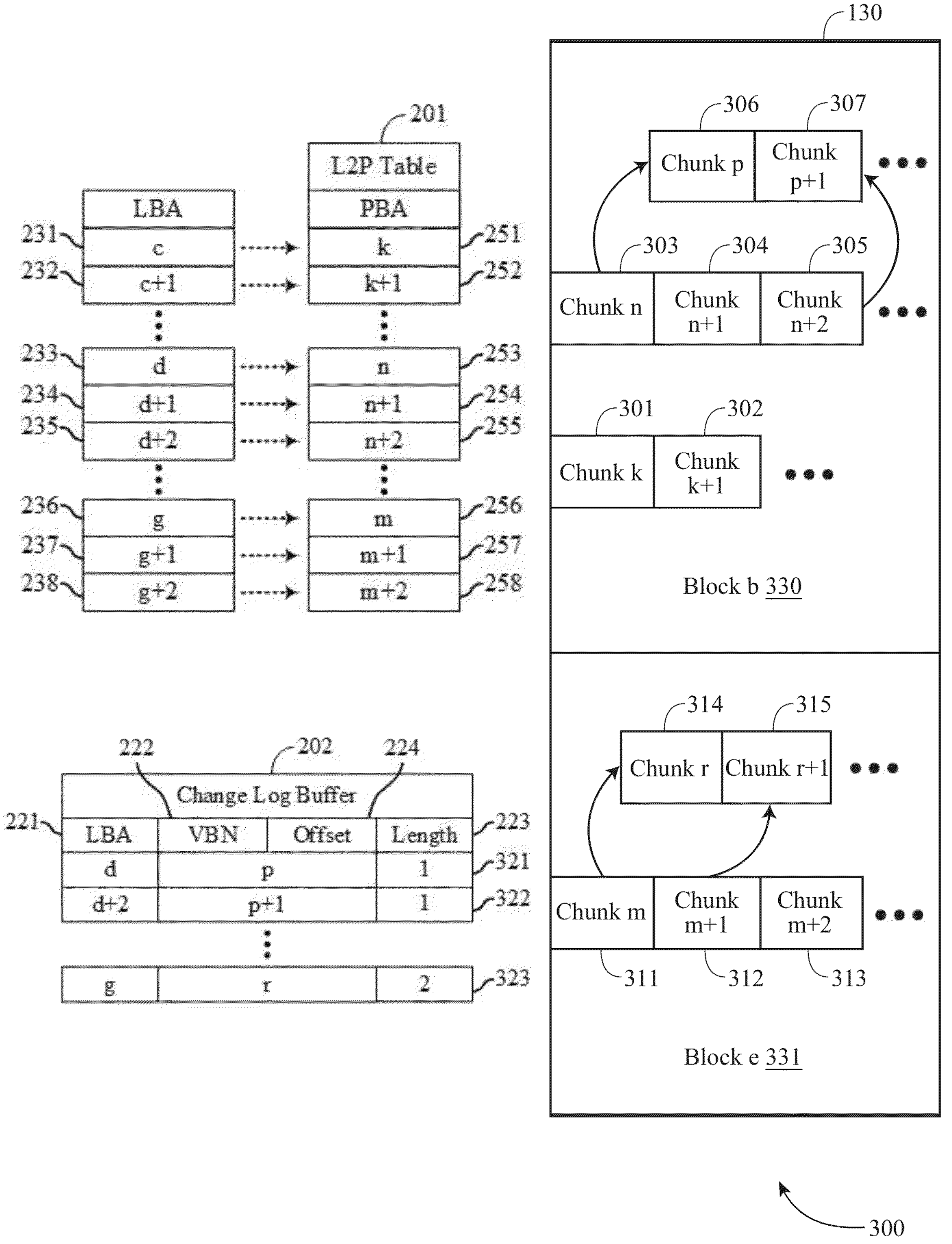

FIG. 3 illustrates an example of a mapping diagram 300 that supports systems and techniques for updating L2P mappings in accordance with examples as disclosed herein. The mapping diagram 300 may be implemented by aspects of the system 100 and the mapping diagram described with reference to FIGS. 1 and 2, respectively. For example, the mapping diagram 300 may be implemented by the memory system controller 115 and a memory device 130. An example mapping of data within a memory device 130 is shown in the L2P table 201 and changes to the mapping are shown in the change log buffer 202. Two open blocks 330-331 are shown, each having a quantity of data chunks 301-307 and 311-315, respectively. The blocks 330-331 may be examples of virtual blocks 180, and the data chunks may be examples of pages 175. An L2P table 201 contains an entry corresponding to each data chunk 301-307 and 311-315 in the two open blocks 330-331 (e.g., virtual blocks). Each L2P table entry represents a PBA value 251-258 corresponding to a respective LBA value 231-238 (e.g., based on a position of the entry in the L2P table 201). The PBA values may be physical addresses where the data associated with the corresponding LBA values are stored.

Block b 330 may include data chunk k 301, data chunk n 303, data chunk n+1 304, and data chunk n+2 305 (e.g., among other contiguous data chunks in addition to those depicted in the example of FIG. 3). Block e 331 includes data chunk m 311, data chunk m+1 312, and data chunk m+2 313 (e.g., among other contiguous data chunks in addition to those depicted in the example of FIG. 3). In the example of FIG. 3, the change log buffer 202 contains, among other entries, three change log entries 321-323. In some examples, each change log entry may include a quantity of bytes, such as 8 bytes, among other quantities. In the example of the change log entry being 8 bytes, the first 4 bytes may indicate the starting LBA for which the change log entry includes updated L2P information (e.g., referred to as LBA ‘d’, for example, in the example of FIG. 3 for illustrative clarity, although the actual LBA may be a bit sequence representing the LBA, such as a 32 bit sequence in the 4 byte example).

The second 4 bytes may be used to indicate the starting PBA to which the data of the starting LBA address is now written to. In this way, the change log entry provides the L2P mapping of the starting LBA to the starting PBA. A combination of the VBN value 222 and the offset value 224 may indicate the starting PBA. The length value 223 may indicate the quantity of consecutive (e.g., contiguous) LBAs and PBAs (e.g., pages 175, data chunks) from the starting LBA and starting PBA (e.g., and including the starting LBA and PBA) to which the change log entry corresponds. Thus, using the starting LBA and PBA and the length value 223, a change log entry may provide the updated L2P mapping for the starting LBA to the starting PBA as well as the next "length-1" consecutive LBA to PBA mappings (see Table 3 below).

TABLE 3

| Starting LBA (included in change log entry) | Starting PBA (indicated by VBN value 222 + offset value 224) |
|---|---|
| Starting LBA + 1 | Starting PBA + 1 |
| . . . | . . . |
| Starting LBA + (length-1) | Starting PBA + (length-1) |

The change log entry may be limited to the top row of Table 3 above, along with the length value 223 (not shown in Table 3) (e.g., and overlap value 225 described with reference to FIGS. 4 and 5). The other L2P mappings to be updated in the L2P table 201 may be determined by the memory system controller 115 (e.g., ad hoc) when updating the L2P table 201 using the change log entry.

In the example of FIG. 3, the L2P table 201 may include entries before being merged with the change log buffer 202. A change log entry 321 references LBA d, a PBA value p (e.g., determined based on the VBN value 222 and the offset value 224), and a length value 1. Accordingly, the change log entry 321 may indicate that data for LBA d is written to data chunk p 306 and that the mapping of LBA d to PBA n indicated by LBA value 233 and PBA value 253 is to be updated to map LBA d to the PBA of data chunk p. 306. The length value of 1 indicates one data chunk is associated with the change log entry 321. Due to writing data for LBA d to the data chunk p 306, data chunk n 303 contains invalid data. Similarly, a change log entry 322 may indicate an update of the L2P mapping for LBA d+2 to PBA n+2 to be an mapping from LBA d+2 to PBA p+1.

A change log entry 323 references LBA g, a PBA value r, and a length value 2. In accordance with the length value of 2, the change log entry 323 may indicate updated L2P mappings for the LBA g and LBA g+1 (e.g., starting LBA g and the next contiguous LBA g+1). The change log entry 323 indicates an updated L2P mapping of the LBA g to the PBA of data chunk r 314, which may correspond to the starting PBA indicated by the change log entry 323. In accordance with the length value of 2, the change log entry 323 also indicates that LBA g+1 maps to the PBA of data chunk r+1 315 (e.g., the next contiguous PBA after the PBA of data chunk r 314).

Figure 4:
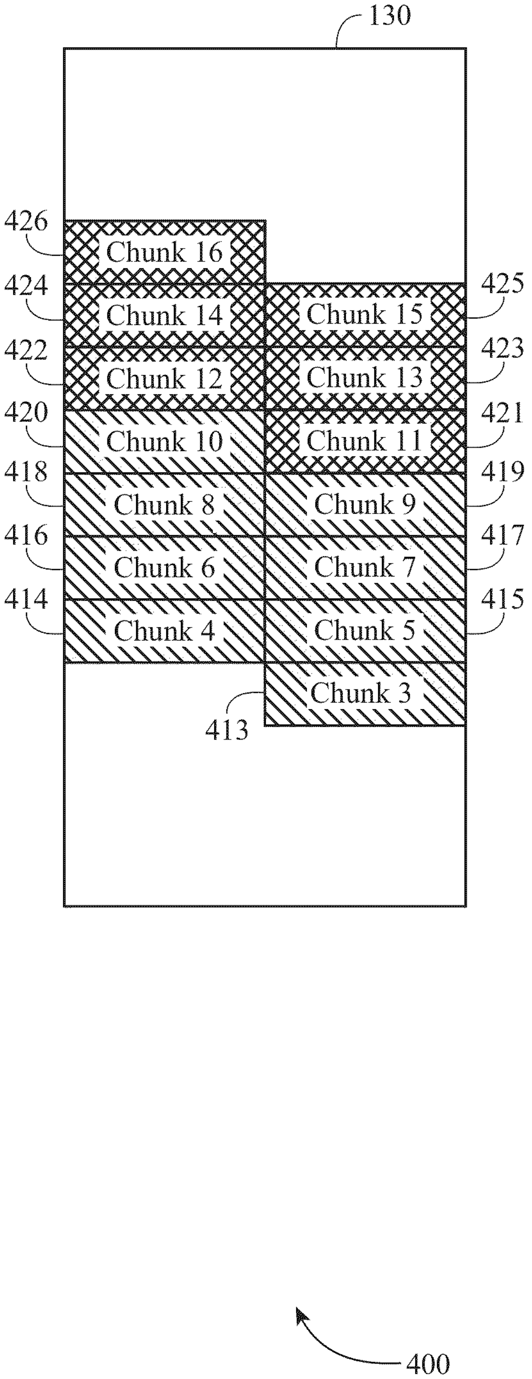

FIG. 4 illustrates an example of entries into a mapping diagram 400 that supports systems and techniques for updating L2P mappings in accordance with examples as disclosed herein. The mapping diagram 400 may be implemented by aspects of the system 100 and the mapping diagram described with reference to FIGS. 1 and 2, respectively. For example, the mapping diagram 400 may be implemented by the memory system controller 115 that implements the change log buffer 202 and a memory device 130. The change log buffer 202 contains the LBA value 221, the VBN value 222, the length value 223, and the offset value 224, as described above. The change log entries 401-402 contain an additional field containing an overlap value 225. The overlap value 225 may be used to indicate whether a change log entry 401-402 has been overlapped with other entries in the change log buffer 202 and is thus no longer valid. That is, a first change log entry that has been overlapped by a second change log entry (e.g., provide updated L2P mappings for at least some of the same LBA values 221) may include invalid L2P mappings.

For example, the first change log entry may be added to provide updated L2P mappings, for example, for the data of LBAs 2-5. If the data of LBAs 2-5 is overwritten to new data chunks (e.g., new pages 175) before the change log buffer 202 is merged with the L2P table 201, the second change log entry may be added to provide updated L2P mappings for LBA 2-5 to the new data chunks. Thus, the L2P mappings for LBAs 2-5 provided by the first change log entry may be invalid as the second change log entry may provide the valid L2P mappings. Accordingly, the first change log entry may be updated to have an overlap value 225 of 1 to indicate that the L2P mappings indicated by the first change log entry are invalid and that the first change log entry is to be skipped to update the L2P table 201.

In the example of FIG. 4, a pair of change log entries 401-402 are shown. The change log entry 401 includes an LBA value 221 of 3, a VBN value 222 of 2, a length value of 8, an offset value 224 of X, and an overlap value 225 of 0 (e.g., which may indicate that the change log entry 401 valid, although another bit value, such as '1', may be used). In the example of FIG. 4, the change log entry 401 (e.g., the VBN value 222 of 2 and offset value of X in combination with the length value of 8) may indicate PBAs of data chunks 3-10 413-420 as this consecutive sequence of data chunks 413-420 begin at data chunk 3 413 (e.g., corresponding to the PBA indicated by the VBN value 222 of 2 and offset value of X) and continues for a sequence of 7 additional consecutive data chunks (e.g., corresponding to the PBAs indicated by the VBN 222 value of 2 and offset value of X+1, X+2, . . . , up through X+7). Accordingly, the change log entry 401 may indicate updated L2P mappings for LBA 3-10 to the PBAs of data chunks 3-10, respectively. Additionally, the change log entry 401 may be used to update the L2P table 201 as part of a merge based on the overlap value 225 being 0, thereby indicating that the data included in data chunks 3-10 (corresponding to the change log entry 401) is valid.

The change log entry 402 includes an LBA value 221 of 12, a VBN value 222 of 2, a length value of 6, an offset value 224 of X+8, and an overlap value 225 of 0. In the example of FIG. 4, the change log entry 402 may similarly indicate PBAs of data chunks 11-16 421-426 as this consecutive sequence of data chunks 421-426 begins at data chunk 11 421 (e.g., corresponding to the PBA indicated by the VBN value 222 of 2 and offset value of X+9) and continues for a sequence of 5 additional consecutive data chunks (e.g., corresponding to the PBAs indicated by the VBN value 222 of 2 and offset value of X+10, . . . , up through X+14). Accordingly, the change log entry 402 may indicate updated L2P mappings for LBA 12-17 to the PBAs of data chunks 11-16, respectively. Additionally, the change log entry 402 may be used to update the L2P table 201 as part of a merge based on the overlap value 225 being 0, thereby indicating that the data included in data chunks 11-16 (corresponding to the change log entry 402) is valid.

In the example of FIG. 4, the change log entries indicate consecutive PBAs with respect to each other (e.g., a last PBA indicated by change log entry 401 corresponds to data chunk 10 and a first PBA indicated by the change log entry 402 corresponds to a next contiguous data chunk 11). In some examples, sets of PBAs indicated by respective change log entries may be contiguous or non-contiguous with respect to each other, included in same or different virtual blocks (e.g., have different VBN values 222), or a combination thereof. In some examples, sets of PBAs indicated by respective change log entries may be non-contiguous due to writing dummy data, which may not cause the memory system to write an entry to the change log, to data chunks between respective sets of PBAs.

Figure 5:
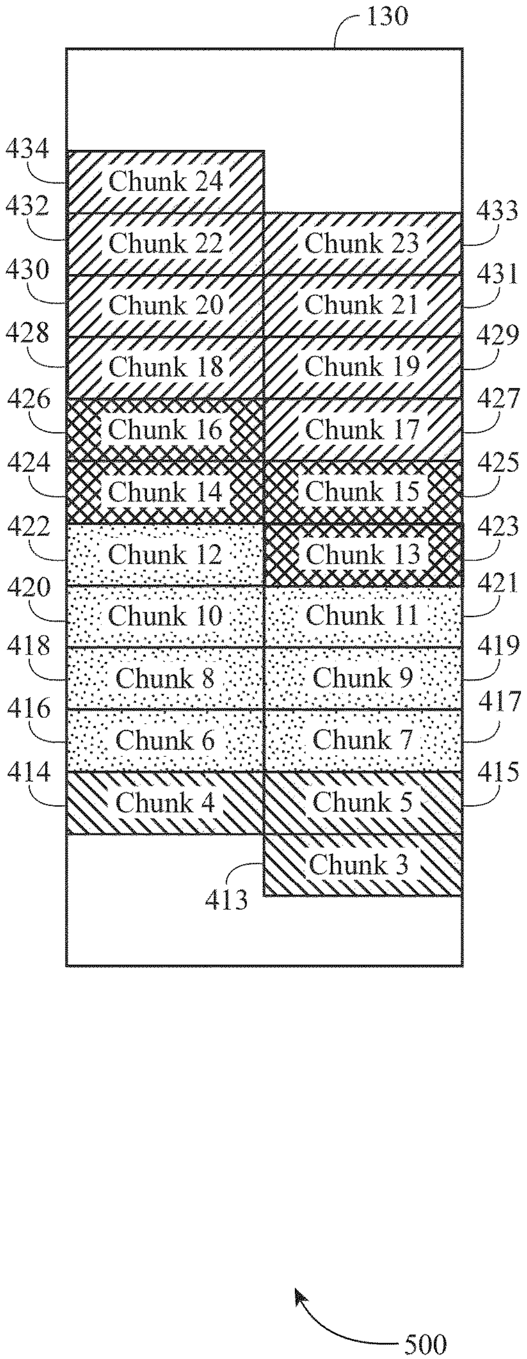

FIG. 5 illustrates an example of a mapping diagram 500 that supports systems and techniques for updating L2P mappings in accordance with examples as disclosed herein. The mapping diagram 500 may be implemented by aspects of the system 100 and the mapping diagram described with reference to FIGS. 1 and 2, respectively. For example, the mapping diagram 500 may be implemented by the memory system controller 115 that implements the change log buffer 202 and be implemented by the memory device 130. The example of change log entries in the change log buffer 202 shows the example of change log entries in the change log buffer 202 of FIG. 4 after writing new data for LBAs 6-13.

For example, in the example of FIG. 4, first data corresponding to LBAs 3-10 may be written to contiguous data chunks 3-10 (e.g., contiguous pages 175) and second data corresponding to LBAs 12-17 may be written to contiguous data chunks 11-16. The change log entry 401 may be written (e.g., added) to the change log buffer 202 to indicate the updated mappings for LBAs 3-10 to data chunks 3-10, respectively, and the change log entry 402 may be written to the change log buffer 202 to indicate the updated L2P mappings for LBAs 12-17 to data chunks 11-16, respectively.

In the example of FIG. 5, after writing the first data and the second data, the memory system controller 115 may write third data that corresponds to at least a subset of the first data and/or a subset of the second data. For example, third data corresponding to LBAs 6-13 may be written to contiguous data chunks 17-24. As such, the previously written data for LBAs 6-13 as part of writing the first data and the second data may be invalidated due to the writing of the third data. Accordingly, the memory system controller 115 may update the change log buffer 202 to indicate the valid L2P mappings for the LBAs 6-13 to the data chunks 17-24.

For example, the memory system controller 115 may write one or more change log entries (e.g., a change log entry 543 and a change log entry 545) to the change log buffer 202 that indicate the updated L2P mappings for the LBAs 6-13 to the PBAs of data chunks 17-24. The change log entries in the change log buffer 202 may be stored sequentially by LBA value to allow searching by LBA values in subsequent operations. This order of change log entries may cause the use of the change log entries 541-546 as the writing of the third data impacts both the change log entries 401 and 402 described with reference to FIG. 4.

For example, the indication of L2P mappings for LBAs 3-5 to data chunks 3-5 by the change log entry 401 may still be valid after writing the third data, however, the indication of L2P mappings for LBAs 6-10 to data chunks 6-10 may be invalid (e.g., data chunks 6-10 may include invalid data based on writing the third data). Similarly, the indication of L2P mappings for LBAs. As such, the memory system controller 115 may update the change log entries 401 and 402 to indicate that the data chunks 6-12 include invalid data (e.g., that the L2P mappings for LBAs 6-10 to data chunks 6-10 and for LBAs 12-13 to data chunks 11-12 are invalid).

To update the change log entries 401 and 402 to support such an indication of invalidity, the memory system controller 115 may divide (e.g., partition) the change log entries 401 and 402 into multiple change log entries. For instance, the change log entries 541-546 in the change log buffer 202 contain references to the data chunks 3-23 413-433. The change log entry 401 may be divided into a change log entry 541 and a change log entry 542. The change log entry 541 may correspond to the still valid data associated with the change log entry 401, and the change log entry 542 may correspond to the invalid data associated with the change log entry 402. For example, the change log entry 541 contains an LBA value of 3, a VBN value 222 of 2, a length value 223 of 3, an offset value 224 of X, and an overlap value 225 of 0. This change log entry 541 points to data chunks 3-5 that were part of the first set of data chunks 3-10 413-420. The data chunks 3-5 413-415 contain valid data, and thus the change log entry 541 may contain an overlap value 225 of 0. That is, the change log entry 541 may be used to update the L2P mapping information for LBAs 3-5 in the L2P table 201 based on including the overlap value 225 of 0.

The change log entry 542 contains an LBA value 221 of 6, a VBN value 222 of 2, a length value 223 of 5, an offset value 224 of X+3, and an overlap value 225 of 1. This change log entry 542 points to data chunks 6-10 that were part of the first set of data chunks 3-10 413-420. For example, the VBN value 222 of 2 and the offset value of X+3 may indicate the PBA of data chunk 6 416 (e.g., the third data chunk after the starting data chunk 3 413). The length value 223 of 5 may indicate that LBAs 6-10 and data chunks 6-10 are associated with the change log entry 542. The data chunks 6-10 416-420 may include invalid data based on writing the third data, and thus the change log entry 542 contains an overlap value of 1. As a result, the memory system controller 115 may skip using the change log entry 542 to update the L2P table 201.

The memory system controller 115 may write the change log entry 543 to the change log buffer 202 to indicate updated LBA mappings for LBAs 6-11. For example, the change log entry 543 contains an LBA value 221 of 6, a VBN value 222 of 2, a length value 223 of 6, an offset value 224 of X+14, and an overlap value 225 of 0. This change log entry 543 points to data chunks 17-22 427-432. For example, the VBN value 222 of 2 and the offset value of X+14 may indicate the PBA of data chunk 17 427 (e.g., the fourteenth data chunk after the starting data chunk 3 413). The length value 223 of 6 may indicate that LBAs 6-11 and data chunks 17-22 are associated with the change log entry 542 (e.g., LBAs 6-11 are mapped to data chunks 17-22). The data chunks 17-22 427-432 contain valid data and thus the change log entry 543 may contain an overlap value of 0. As a result, the memory system controller 115 may use the change log entry 543 to update the L2P table 201. It is noted that, in the example of FIG. 5, the third data is written to a next contiguous data chunk after the second data, and the change log entry 543 is written with the VBN value 222 of 2 and the offset value 224 of X+14 to reflect the contiguous writing. In some examples, the third data may be written to non-contiguous data chunks of the virtual block corresponding to the VBN value of 2 or to data chunks of another open virtual block (e.g., corresponding to a VBN value 222 other than 2), and the VBA value 222 and the offset value 224 are written to reflect the starting PBA of the data chunk to which the third data is written.

The change log entry 402 may be divided into a change log entry 544 and a change log entry 545. The change log entry 544 may correspond to the still valid data associated with the change log entry 402, and the change log entry 545 may correspond to the invalid data associated with the change log entry 402. For example, the change log entry 544 contains an LBA value of 12, a VBN value 222 of 2, a length value 223 of 2, an offset value 224 of X+8, and an overlap value 225 of 1. This change log entry 544 points to data chunks 11-12 that were part of the second set of data chunks 11-16 421-426. For example, the VBN value 222 of 2 and the offset value of X+8 may indicate the PBA of data chunk 11 421 (e.g., the eighth data chunk after the starting data chunk 3 413). The length value 223 of 2 may indicate that LBAs 12-13 and data chunks 11-12 are associated with the change log entry 544. The data chunks 11-12 421-422 may include invalid data based on writing the third data, and thus the change log entry 544 may contain an overlap value of 1. As a result, the memory system controller 115 may skip using the change log entry 544 to update the L2P table 201.

The change log entry 546 contains an LBA value of 14, a VBN value 222 of 2, a length value 223 of 4, an offset value 224 of X+10, and an overlap value 225 of 0. This change log entry 546 points to data chunks 13-16 423-426 that were part of the second set of data chunks 11-16 421-426. For example, the VBN value 222 of 2 and the offset value of X+10 may indicate the PBA of data chunk 13 423 (e.g., the tenth data chunk after the starting data chunk 3 413). The length value 223 of 4 may indicate that LBAs 14-17 and data chunks 13-16 are associated with the change log entry 546 (e.g., LBAs 14-17 are mapped to data chunks 13-16). The data chunks 13-16 423-426 contain valid data and thus the change log entry 546 may contain an overlap value of 0. As a result, the memory system controller 115 may use the change log entry 546 to update the L2P table 201.

In the example of FIG. 5, writing the third data impact both the change log entries 401 and 402 (e.g., write data for LBAs that are indicated in both the change log entries 401 and 402). As such, the memory system controller 115 may write two change log entries to capture the updated L2P mappings for the LBAs 6-13 (e.g., due to the sequential order of change log entries by LBA). For example, the memory system controller 115 may write the change log entry 543, as described, to indicate L2P mappings for LBAs 6-11. The memory system controller 115 may also write the change log entry 545 to the change log buffer that contains an LBA value of 12, a VBN value 222 of 2, a length value 223 of 2, an offset value 224 of X+20, and an overlap value 225 of 0. This change log entry 545 points to data chunks 23-24 433-434. For example, the VBN value 222 of 2 and the offset value of X+20 may indicate the PBA of data chunk 23 433 (e.g., the twentieth data chunk after the starting data chunk 3 413). The length value 223 of 2 may indicate that LBAs 12-13 and data chunks 23-24 are associated with the change log entry 545 (e.g., LBAs 12-13 are mapped to data chunks 23-24). The data chunks 23-24 433-434 contain valid data and thus the change log entry 545 may contain an overlap value of 0. As a result, the memory system controller 115 may use the change log entry 545 to update the L2P table 201.

In some examples, if all of the data for LBAs indicated by a given change log entry is invalidated (e.g., overwritten), the memory system controller 115 may update the change log entry by changing the overlap value 225 to 1 (e.g., rather than dividing the change log entry into multiple change log entries, as the change log entry may no longer indicate updated L2P mappings for any valid data).

In some examples, the overlap value 225 may be excluded from the change log entries and an invalid (e.g., overwritten) change log entry may instead be indicated based on the LBA value 221. For example, as part of dividing the change log entry 401, the memory system controller 115 may update the LBA value 221 of the change log entry 542 to be an LBA that is indicative of the change log entry 542 including L2P mappings that are invalid and that the change log entry 542 is to be skipped as part of updating the L2P table 201. For instance, the memory system controller 115 may update the LBA value 221 to be an out-of-range LBA, such as an LBA that exceeds a capacity of the memory system controller 115. Similarly, the memory system controller 115 may update the LBA value 221 of the change log entry 544 to indicate that the change log entry 544 includes L2P mappings that are invalid and that the change log entry 544 is to be skipped as part of updating the L2P table 201 (e.g., update the change log entry 544 to include an out-of-range LBA. That is, the memory system controller 115 may update the LBA value 221 of a change log entry to implicitly indicate that the change log entry is invalid. Here, the change log entries 542 and 544 may be included at an end of the change log 202 (e.g., in accordance with the entries being included sequentially according to LBA value). By updating the change log entries 542 and 544 to include LBA values 221 that indicate the invalidity of the change log entries, the memory system controller 115 may avoid finding duplicate entries as part of a search within the change log 202 for the LBA values 221 of the change log entries 543 and 545.

In some examples, the overlap value 225 may be excluded from the change log entries and information related to an invalid (e.g., overwritten) change log entry may instead be removed from the change log 202. For example, as part of updating the change log entry 401 based on writing the third data, the memory system controller 115 may update the change log entry 401 to be the change log entry 541 and remove information related to the change log entry 542 (e.g., refrain from writing the change log entry 542 to the change log 202). Similarly, as part of updating the change log entry 402, the memory system controller may update the change entry 402 to be the change log entry 546 and remove information related to the change log entry 544 (e.g., refrain from writing the change log entry 544 to the change log 202). Here, because invalid change log entries may not be added to the change log 202, the overlap value 225 may be unnecessary and removed from the change log entries (e.g., the bit used for the overlap value 225 may be used for other purposes, such as the length value 223, the offset value 224, etc.).

Figure 6:
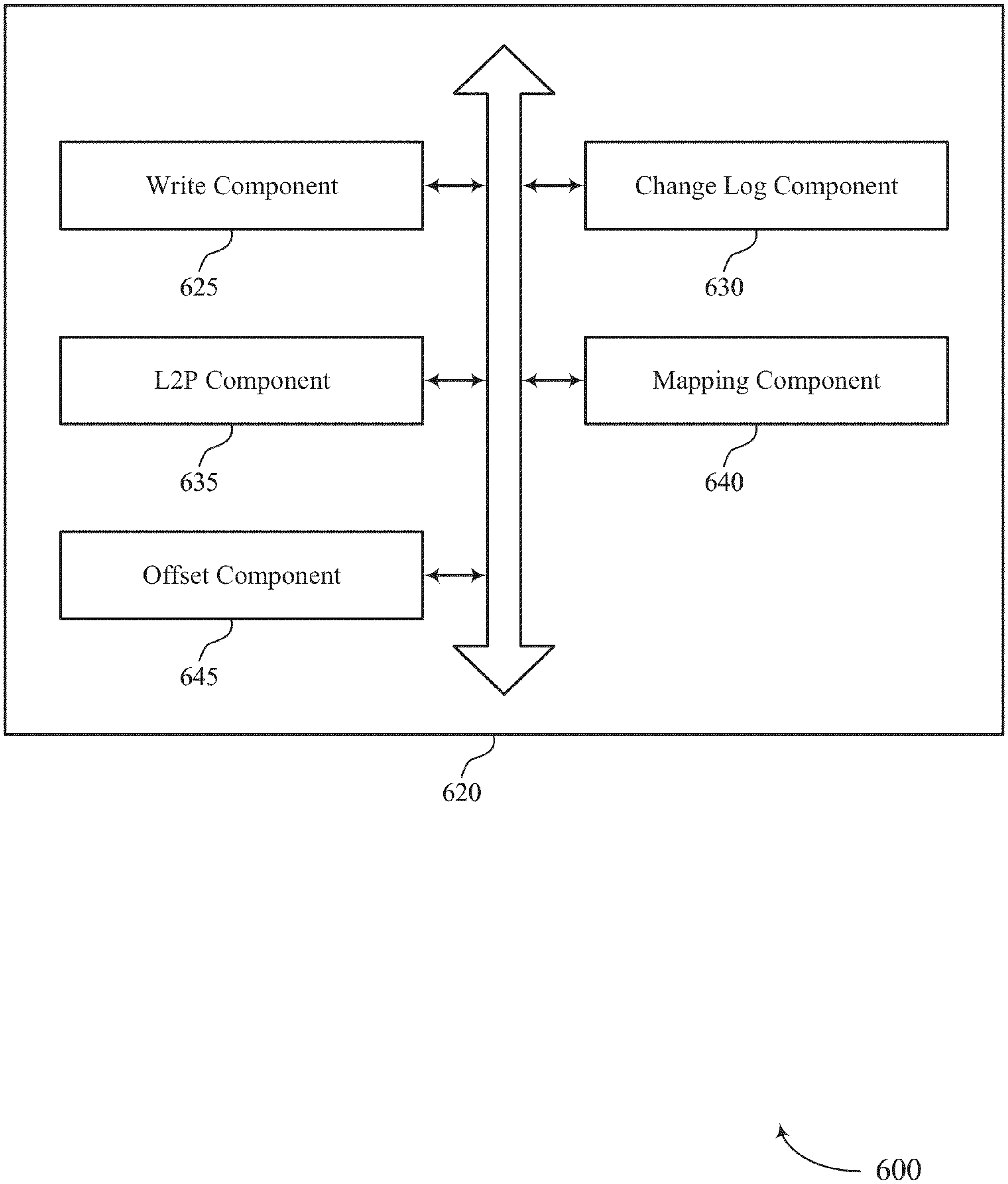
FIG. 6 illustrates a block diagram of a memory system that supports systems and techniques for updating L2P mappings in accordance with examples as disclosed herein.

FIG. 6 illustrates a block diagram 600 of a memory system 620 that supports systems and techniques for updating L2P mappings in accordance with examples as disclosed herein. The memory system 620 may be an example of aspects of a memory system as described with reference to FIGS. 1 through 5. The memory system 620, or various components thereof, may be an example of means for performing various aspects of systems and techniques for updating L2P mappings as described herein. For example, the memory system 620 may include a write component 625, a change log component 630, a L2P component 635, a mapping component 640, an offset component 645, or any combination thereof. Each of these components may communicate, directly or indirectly, with one another (e.g., via one or more buses).

The write component 625 may be configured as or otherwise support a means for writing data to a plurality of contiguous pages of a non-volatile memory device of a memory system. The change log component 630 may be configured as or otherwise support a means for writing an entry to a change log associated with updating L2P mapping information associated with the data, the entry of the change log including a first indication of a virtual block that includes the plurality of contiguous pages and a second indication of a quantity of the plurality of contiguous pages. The L2P component 635 may be configured as or otherwise support a means for updating the L2P mapping information associated with the data based, at least in part on, the entry of the change log.

In some examples, the mapping component 640 may be configured as or otherwise support a means for storing a mapping between a set of indexes used as indications of the virtual block in the entry and identifiers of virtual blocks, where the first indication of the virtual block includes a first index mapped to an identifier of the virtual block.

In some examples, to support updating the L2P mapping information, the L2P component 635 may be configured as or otherwise support a means for determining the virtual block that includes the plurality of contiguous pages based at least in part on the first indication of the virtual block and the mapping. In some examples, to support updating the L2P mapping information, the L2P component 635 may be configured as or otherwise support a means for updating the L2P mapping information to map logical addresses associated with the data to the plurality of contiguous pages based, at least in part on, the determination and the second indication of the quantity of the plurality of contiguous pages.

In some examples, the write component 625 may be configured as or otherwise support a means for opening a second virtual block of the memory system for writing additional data. In some examples, the mapping component 640 may be configured as or otherwise support a means for updating the mapping to map a second index of the set of indexes to a second identifier of the second virtual block based, at least in part on, opening the second virtual block.

In some examples, the first indication of the virtual block includes a first quantity of bits that is less than a second quantity of bits of an identifier of the virtual block.

In some examples, the entry of the change log includes a third indication of a page offset within the virtual block, the page offset indicating a first page of the plurality of contiguous pages to which the entry of the change log corresponds.

In some examples, the offset component 645 may be configured as or otherwise support a means for storing, prior to writing the data, a current page offset within the virtual block. In some examples, the offset component 645 may be configured as or otherwise support a means for determining the page offset within the virtual block based, at least in part on, the current page offset and the third indication of the page offset within the virtual block, where the L2P mapping information is updated based, at least in part on, the determination. In some examples, the offset component 645 may be configured as or otherwise support a means for updating the current page offset to correspond to a next contiguous page after the plurality of contiguous pages based, at least in part on, updating the L2P mapping information.

In some examples, to support determining the page offset, the offset component 645 may be configured as or otherwise support a means for adding an offset indicated by the third indication of the page offset to the current page offset.

In some examples, the third indication of the page offset includes a first quantity of bits that is less than a second quantity of bits of the page offset.

In some examples, the entry of the change log includes a third indication of whether the data corresponding to the entry of the change log is valid. In some examples, the L2P mapping information associated with the data is updated based, at least in part on, the third indication indicating that the data is valid.

In some examples, the entry of the change log includes a third indication of whether the data corresponding to the entry of the change log is valid. In some examples, the write component 625 may be configured as or otherwise support a means for writing, after writing the data, second data that corresponds to at least a subset of the data written to at least a subset of contiguous pages of the plurality of contiguous pages, the second data written to a second plurality of contiguous pages of the non-volatile memory device, where at least the subset of the data is invalidated based at least in part on writing the second data. Prior sentence makes no sense. In some examples, the change log component 630 may be configured as or otherwise support a means for writing one or more second entries to the change log, the one or more second entries of the change log each including a fourth indication of the virtual block, or a second virtual block, that includes the second plurality of contiguous pages, a fifth indication of a respective second quantity of the second plurality of contiguous pages, and a sixth indication that the second data is valid. In some examples, the change log component 630 may be configured as or otherwise support a means for updating the entry of the change log to indicate that at least the subset of the data is invalid. In some examples, the L2P component 635 may be configured as or otherwise support a means for updating L2P mapping information associated with the second data based, at least in part on, the one or more second entries of the change log. In some examples, to update the L2P mapping information, the L2P component 635 may be configured as or otherwise support a means for skipping updating L2P mapping information associated with at least the subset of the data based at least in part on updating the entry of the change log.

In some examples, to support updating the entry of the change log, the change log component 630 may be configured as or otherwise support a means for dividing the entry of the change log into a set of entries of the change log, the set of entries including a first entry corresponding to a portion of at least the subset of the data and a second entry corresponding to a portion of a second subset of the data that is valid, the first entry including a respective third indication that the portion of at least the subset of the data is invalid, the second entry including a respective third indication that the portion of the second subset of data is valid.

In some examples, the plurality of contiguous pages include a plurality of contiguous 4 KB chunks of data.

FIG. 7 illustrates a flowchart showing a method 700 that supports systems and techniques for updating L2P mappings in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally or alternatively, the memory system may perform aspects of the described functions using special-purpose hardware.

At 705, the method may include writing data to a plurality of contiguous pages of a non-volatile memory device of a memory system. The operations of 705 may be performed in accordance with examples as disclosed herein. In some examples, aspects of the operations of 705 may be performed by a write component 625 as described with reference to FIG. 6.

At 710, the method may include writing an entry to a change log associated with updating L2P mapping information associated with the data, the entry of the change log including a first indication of a virtual block that includes the plurality of contiguous pages and a second indication of a quantity of the plurality of contiguous pages. The operations of 710 may be performed in accordance with examples as disclosed herein. In some examples, aspects of the operations of 710 may be performed by a change log component 630 as described with reference to FIG. 6.

At 715, the method may include updating the L2P mapping information associated with the data based at least in part on the entry of the change log. The operations of 715 may be performed in accordance with examples as disclosed herein. In some examples, aspects of the operations of 715 may be performed by a L2P component 635 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for writing data to a plurality of contiguous pages of a non-volatile memory device of a memory system; writing an entry to a change log associated with updating L2P mapping information associated with the data, the entry of the change log including a first indication of a virtual block that includes the plurality of contiguous pages and a second indication of a quantity of the plurality of contiguous pages; and updating the L2P mapping information associated with the data based, at least in part on, the entry of the change log.

Aspect 2: The method, apparatus, or non-transitory computer-readable medium of aspect 1, further including operations, features, circuitry, logic, means, or instructions, or any combination thereof for storing a mapping between a set of indexes used as indications of the virtual block in the entry and identifiers of virtual blocks, where the first indication of the virtual block includes a first index mapped to an identifier of the virtual block.

Aspect 3: The method, apparatus, or non-transitory computer-readable medium of aspect 2, where updating the L2P mapping information includes operations, features, circuitry, logic, means, or instructions, or any combination thereof for determining the virtual block that includes the plurality of contiguous pages based, at least in part on, the first indication of the virtual block and the mapping and updating of the L2P mapping information to map logical addresses associated with the data to the plurality of contiguous pages based, at least in part on, the determination and the second indication of the quantity of the plurality of contiguous pages.

Aspect 4: The method, apparatus, or non-transitory computer-readable medium of any of aspects 2 through 3, further including operations, features, circuitry, logic, means, or instructions, or any combination thereof for opening a second virtual block of the memory system for writing additional data and updating the mapping to map a second index of the set of indexes to a second identifier of the second virtual block based, at least in part on, opening the second virtual block.

Aspect 5: The method, apparatus, or non-transitory computer-readable medium of any of aspects 1 through 4, where the first indication of the virtual block includes a first quantity of bits that is less than a second quantity of bits of an identifier of the virtual block.

Aspect 6: The method, apparatus, or non-transitory computer-readable medium of any of aspects 1 through 5, where the entry of the change log includes a third indication of a page offset within the virtual block, the page offset indicating a first page of the plurality of contiguous pages to which the entry of the change log corresponds.

Aspect 7: The method, apparatus, or non-transitory computer-readable medium of aspect 6, further including operations, features, circuitry, logic, means, or instructions, or any combination thereof for storing, prior to writing the data, a current page offset within the virtual block; determining the page offset within the virtual block based, at least in part on, the current page offset and the third indication of the page offset within the virtual block, where the L2P mapping information is updated based, at least in part on, the determination; and updating the current page offset to correspond to a next contiguous page after the plurality of contiguous pages based, at least in part on, updating the L2P mapping information.

Aspect 8: The method, apparatus, or non-transitory computer-readable medium of aspect 7, where determining the page offset includes operations, features, circuitry, logic, means, or instructions, or any combination thereof for adding an offset indicated by the third indication of the page offset to the current page offset.

Aspect 9: The method, apparatus, or non-transitory computer-readable medium of any of aspects 6 through 8, where the third indication of the page offset includes a first quantity of bits that is less than a second quantity of bits of the page offset.

Aspect 10: The method, apparatus, or non-transitory computer-readable medium of any of aspects 1 through 9, where the entry of the change log includes a third indication of whether the data corresponding to the entry of the change log is valid and the L2P mapping information associated with the data is updated based, at least in part on, the third indication that the data is valid.

Aspect 11: The method, apparatus, or non-transitory computer-readable medium of any of aspects 1 through 9, where the entry of the change log includes a third indication of whether the data corresponding to the entry of the change log is valid and the method, apparatuses, and non-transitory computer-readable medium further includes operations, features, circuitry, logic, means, or instructions, or any combination thereof for writing, after writing the data, second data that corresponds to at least a subset of the data written to at least a subset of contiguous pages of the plurality of contiguous pages, the second data written to a second plurality of contiguous pages of the non-volatile memory device, where at least the subset of the data is invalidated based, at least in part on writing the second data; writing one or more second entries to the change log, the one or more second entries of the change log each including a fourth indication of the virtual block, or a second virtual block, that includes the second plurality of contiguous pages, a fifth indication of a respective second quantity of the second plurality of contiguous pages, and a sixth indication that the second data is valid; updating the entry of the change log to indicate that at least the subset of the data is invalid; and updating L2P mapping information associated with the second data based, at least in part on, the one or more second entries of the change log, where updating the L2P mapping information includes skipping updating L2P mapping information associated with at least the subset of the data based, at least in part on, updating the entry of the change log.

Aspect 12: The method, apparatus, or non-transitory computer-readable medium of aspect 11, where updating the entry of the change log includes operations, features, circuitry, logic, means, or instructions, or any combination thereof for dividing the entry of the change log into a set of entries of the change log, the set of entries including a first entry corresponding to a portion of at least the subset of the data and a second entry corresponding to a portion of a second subset of the data that is valid, the first entry including a respective third indication that the portion of at least the subset of the data is invalid, the second entry including a respective third indication that the portion of the second subset of data is valid.

Aspect 13: The method, apparatus, or non-transitory computer-readable medium of any of aspects 1 through 12, where the plurality of contiguous pages include a plurality of contiguous 4 KB chunks of data.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more memory devices; and processing circuitry coupled with the one or more memory devices and configured to cause the memory system to:

write first data to a plurality of contiguous pages of a non-volatile memory device of the memory system;

write an entry to a change log associated with updating logical-to-physical mapping information associated with the first data, the entry of the change log comprising:

a first indication of a first virtual block that comprises the plurality of contiguous pages, the first indication of the first virtual block comprising a first index mapped to a first identifier of the first virtual block in accordance with a mapping;

a second indication of a quantity of the plurality of contiguous pages; and a third indication of a logical address associated with the first data;

update the mapping to map a second index to a second identifier of a second virtual block in response to opening the second virtual block for writing second data; and update the logical-to-physical mapping information associated with the first data in accordance with the entry of the change log.

2. The memory system of claim 1, wherein the processing circuitry is further configured to cause the memory system to:

store the mapping that is between a set of indexes used as indications of the first virtual block in the entry and identifiers of virtual blocks.

3. The memory system of claim 2, wherein, to update the logical-to-physical mapping information, the processing circuitry is configured to cause the memory system to:

determine the first virtual block that comprises the plurality of contiguous pages in accordance with the first indication of the first virtual block and the mapping; and update the logical-to-physical mapping information to map the logical address associated with the first data to the plurality of contiguous pages in response to the determining and in accordance with the second indication of the quantity of the plurality of contiguous pages and the third indication of the logical address associated with the first data.

4. The memory system of claim 2, wherein the processing circuitry is further configured to cause the memory system to:

write the second data to a second plurality of contiguous pages of the non-volatile memory device;

write a second entry to the change log associated with updating logical-to-physical mapping information associated with the second data, the second entry comprising:

a fourth indication of the second virtual block that comprises the second plurality of contiguous pages, the fourth indication comprising the second index mapped to the second identifier of the second virtual block in accordance with the mapping;

a fifth indication of a second quantity of the second plurality of contiguous pages; and a sixth indication of a second logical address associated with the second data; and update the logical-to-physical mapping information associated with the second data in accordance with the second entry of the change log.

5. The memory system of claim 1, wherein the first indication of the first virtual block comprises a first quantity of bits that is less than a second quantity of bits of the first identifier of the first virtual block.

6. The memory system of claim 1, wherein the entry of the change log comprises a fourth indication of a page offset within the first virtual block, the page offset indicating a first page of the plurality of contiguous pages to which the entry of the change log corresponds.

7. The memory system of claim 6, wherein the processing circuitry is further configured to cause the memory system to:

store, prior to writing the first data, a current page offset within the first virtual block;

determine the page offset within the first virtual block in accordance with the current page offset and the fourth indication of the page offset within the first virtual block, wherein the logical-to-physical mapping information is updated in response to the determining; and update the current page offset to correspond to a next contiguous page after the plurality of contiguous pages in response to updating the logical-to-physical mapping information.

8. The memory system of claim 7, wherein, to determine the page offset, the processing circuitry is configured to cause the memory system to:

add an offset indicated by the fourth indication of the page offset to the current page offset.

9. The memory system of claim 6, wherein the fourth indication of the page offset comprises a first quantity of bits that is less than a second quantity of bits of the page offset.

10. The memory system of claim 1, wherein:

the entry of the change log comprises a fourth indication of whether the first data corresponding to the entry of the change log is valid, and the logical-to-physical mapping information associated with the first data is updated in accordance with the fourth indication indicating that the first data is valid.

11. The memory system of claim 1, wherein the entry of the change log comprises a fourth indication of whether the first data corresponding to the entry of the change log is valid, and the processing circuitry is further configured to cause the memory system to:

write, after writing the first data, third data that corresponds to at least a subset of the first data written to at least a subset of contiguous pages of the plurality of contiguous pages, the third data written to a second plurality of contiguous pages of the non-volatile memory device, wherein at least the subset of the first data is invalidated in response to writing the third data;

write one or more second entries to the change log, the one or more second entries of the change log each comprising a fifth indication of the first virtual block, or a third virtual block, that comprises the second plurality of contiguous pages, a sixth indication of a respective second quantity of the second plurality of contiguous pages, a seventh indication of a second logical address associated with the third data, and an eighth indication that the third data is valid;

update the entry of the change log to indicate that at least the subset of the first data is invalid; and update logical-to-physical mapping information associated with the third data in accordance with the one or more second entries of the change log, wherein, to update the logical-to-physical mapping information, the processing circuitry is configured to cause the memory system to:

skip updating logical-to-physical mapping information associated with at least the subset of the first data in response to updating the entry of the change log.

12. The memory system of claim 11, wherein, to update the entry of the change log, the processing circuitry is configured to cause the memory system to:

divide the entry of the change log into a set of entries of the change log, the set of entries comprising a first entry corresponding to a portion of at least the subset of the first data and a second entry corresponding to a portion of a second subset of the first data that is valid, the first entry comprising a respective fourth indication that the portion of at least the subset of the first data is invalid, the second entry comprising a respective fourth indication that the portion of the second subset of the first data is valid.

13. The memory system of claim 1, wherein the plurality of contiguous pages comprise a plurality of contiguous 4 kilobyte chunks of data.

14. A non-transitory computer-readable medium storing code comprising instructions which, when executed by processing circuitry of a memory system, cause the memory system to:

write data to a plurality of contiguous pages of a non-volatile memory device of the memory system;

write an entry to a change log associated with updating logical-to-physical mapping information associated with the data, the entry of the change log comprising a first indication of a virtual block that comprises the plurality of contiguous pages, a second indication of a quantity of the plurality of contiguous pages, and a third indication of a logical address associated with the data; and update the logical-to-physical mapping information to map the logical address associated with the data to the plurality of contiguous pages in accordance with the second indication of the quantity of the plurality of contiguous pages and the third indication of the logical address associated with the data, wherein the updating is in response to identifying the virtual block that comprises the plurality of contiguous pages, and wherein the identifying is in accordance with a mapping between the first indication of the virtual block and an identifier of the virtual block.

15. The non-transitory computer-readable medium of claim 14, wherein the instructions, when executed by the processing circuitry of the memory system, further cause the memory system to store the mapping between a set of indexes used as indications of the virtual block in the entry and identifiers of virtual blocks, wherein the first indication of the virtual block comprises a first index mapped to the identifier of the virtual block.

16. The non-transitory computer-readable medium of claim 14, wherein the first indication of the virtual block comprises a first quantity of bits that is less than a second quantity of bits of the identifier of the virtual block.

17. The non-transitory computer-readable medium of claim 14, wherein the entry of the change log comprises a fourth indication of a page offset within the virtual block, the page offset indicating a first page of the plurality of contiguous pages to which the entry of the change log corresponds.

18. The non-transitory computer-readable medium of claim 14, wherein:

the entry of the change log comprises a fourth indication of whether the data corresponding to the entry of the change log is valid, and the logical-to-physical mapping information associated with the data is updated in accordance with the fourth indication indicating that the data is valid.

19. A method, comprising:

writing data to a plurality of contiguous pages of a non-volatile memory device of a memory system;

writing an entry to a change log associated with updating logical-to-physical mapping information associated with the data, the entry of the change log comprising a first indication of a virtual block that comprises the plurality of contiguous pages, a second indication of a quantity of the plurality of contiguous pages, and a third indication of a logical address associated with the data; and updating the logical-to-physical mapping information to map the logical address associated with the data to the plurality of contiguous pages in accordance with the second indication of the quantity of the plurality of contiguous pages and the third indication of the logical address associated with the data, wherein the updating is in response to identifying the virtual block that comprises the plurality of contiguous pages, and wherein the identifying is in accordance with a mapping between the first indication of the virtual block and an identifier of the virtual block.

* * * * *